United States Patent
Yu et al.

(10) Patent No.: US 8,521,349 B2
(45) Date of Patent: Aug. 27, 2013

(54) VEHICLE STEERABILITY AND STABILITY CONTROL VIA INDEPENDENT WHEEL TORQUE CONTROL

(75) Inventors: Hai Yu, Canton, MI (US); Wei Liang, Farmington Hills, MI (US); Ming Lang Kuang, Canton, MI (US); Ryan Abraham McGee, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 486 days.

(21) Appl. No.: 12/813,343

(22) Filed: Jun. 10, 2010

(65) Prior Publication Data

US 2011/0307129 A1 Dec. 15, 2011

(51) Int. Cl.
*B60W 30/02* (2012.01)
*B60L 15/20* (2006.01)

(52) U.S. Cl.
USPC .......................................................... 701/22

(58) Field of Classification Search
USPC .................................... 701/22, 72
See application file for complete search history.

(56) References Cited

U.S. PATENT DOCUMENTS

| | | | | |
|---|---|---|---|---|
| 5,376,868 A | * | 12/1994 | Toyoda et al. | 318/587 |
| 5,453,930 A | * | 9/1995 | Imaseki et al. | 701/22 |
| 6,659,570 B2 | | 12/2003 | Nakamura | 303/146 |
| 6,704,622 B2 | * | 3/2004 | Tinskey et al. | 701/1 |
| 6,885,931 B2 | * | 4/2005 | Anwar | 701/72 |
| 6,909,959 B2 | * | 6/2005 | Hallowell | 701/88 |
| 6,954,691 B2 | * | 10/2005 | Roll et al. | 701/70 |
| 7,072,751 B2 | | 7/2006 | Shimizu | |
| 7,137,673 B2 | * | 11/2006 | Anwar | 303/146 |
| 7,386,379 B2 | | 6/2008 | Naik et al. | |
| 7,440,834 B2 | * | 10/2008 | Yamaguchi et al. | 701/69 |

FOREIGN PATENT DOCUMENTS

| | | | |
|---|---|---|---|
| DE | 112006003236 T5 | | 2/2008 |
| JP | 10210604 A | * | 8/1998 |
| JP | 11187506 | * | 7/1999 |
| JP | 2005354762 A | | 12/2005 |
| JP | 2008167640 A | * | 7/2008 |
| JP | 2008178255 A | * | 7/2008 |
| JP | 2009044916 A | * | 2/2009 |
| WO | 2007064025 A1 | | 6/2007 |

OTHER PUBLICATIONS

Feiqiang, Li et al., "Motor torque based vehicle stability control for four-wheel-drive electric vehicles", 2009 IEEE Vehicle Power and Propulsion Conference, Sep. 7-10, 2009, pp. 1596-1601.*

(Continued)

*Primary Examiner* — James Trammell
*Assistant Examiner* — David Testardi
(74) *Attorney, Agent, or Firm* — Angela M. Brunetti; Raymond Coppiellie

(57) ABSTRACT

An independent wheel torque control algorithm is disclosed for controlling motor torques applied to individual electric motors coupled to vehicle wheels in an electric vehicle. In a first range of vehicle states, vehicle steerability is favored so that the operator of the vehicle suffers little or no longitudinal propulsion loss while steering is enhanced. In a second range of vehicle states, vehicle stability is favored. According to embodiments of the disclosure, a desired yaw moment is computed and then may be reduced in magnitude due to system limitations, electrical or friction limits, which prevents the desired yaw moment from being fully realized.

17 Claims, 4 Drawing Sheets

(56) References Cited

OTHER PUBLICATIONS

Yu, Houyu et al., "Potential energy analysis and limit cycle control for dynamics stability of in-wheel driving electric vehicle", 2008 IEEE Vehicle Power and Propulsion Conference, Sep. 3-5, 2008, pp. 1-5.*

He, Peng et al., "Optimum traction force distribution for stability improvement of 4WD EV in critical driving condition", 9th IEEE International Workshop on Advanced Motion Control, 2006, pp. 596-601.*

Hallowell, Stephen et al., "All-wheel-driving using independent torque control for each wheel", Proceedings of the American Control Conference, Jun. 4-6, 2003, IEEE, pp. 2590ff.*

Shimura, Akihiko et al., "Rule extraction with connection forgetting from neural network DYC controller", Transactions of the Japan Society of Mechanical Engineers. C. vol. 67 (661), Sep. 25, 2001, pp. 2837-2842.*

Sakai, Shin-ichiro et al., "Motion control in an electric vehicle with four independently driven in wheel motors", IEEE/ASME Transactions on Mechatronics, vol. 4 No. 1, Mar. 1999, pp. 9ff.*

Geng, Cong et al., "Body slip angle estimation and control for electric vehicle with in-wheel motors", 33rd Annual Conference of the IEEE Industrial Electronics Society (IECON), Nov. 5-8, 2007, pp. 351ff.*

Geng, Cong et al., "Direct yaw-moment control of an in-wheel-motored electric vehicle based on body slip angle fuzzy observer", IEEE Transactions on Industrial Electronics, vol. 56 No. 5, May 2009, pp. 1411ff.*

Feiqiang, Li et al., On the Vehicle Stability Control for Electric Vehicle Based on Control Allocation, IEEE Vehicle Power and Propulsion Conferences (VPPC), Sep. 3-5, 2008, Harbin, China, pp. 1-6.

Kakalis, Leonidas et al., Brake Based Torque Vectoring for Sport Vehicle Performance Improvement, SAE Technical Paper Series, 2008-01-0596, 2008 World Congress, Detroit, Michigan, Apr. 14-17, 2008, pp. 1-14.

* cited by examiner

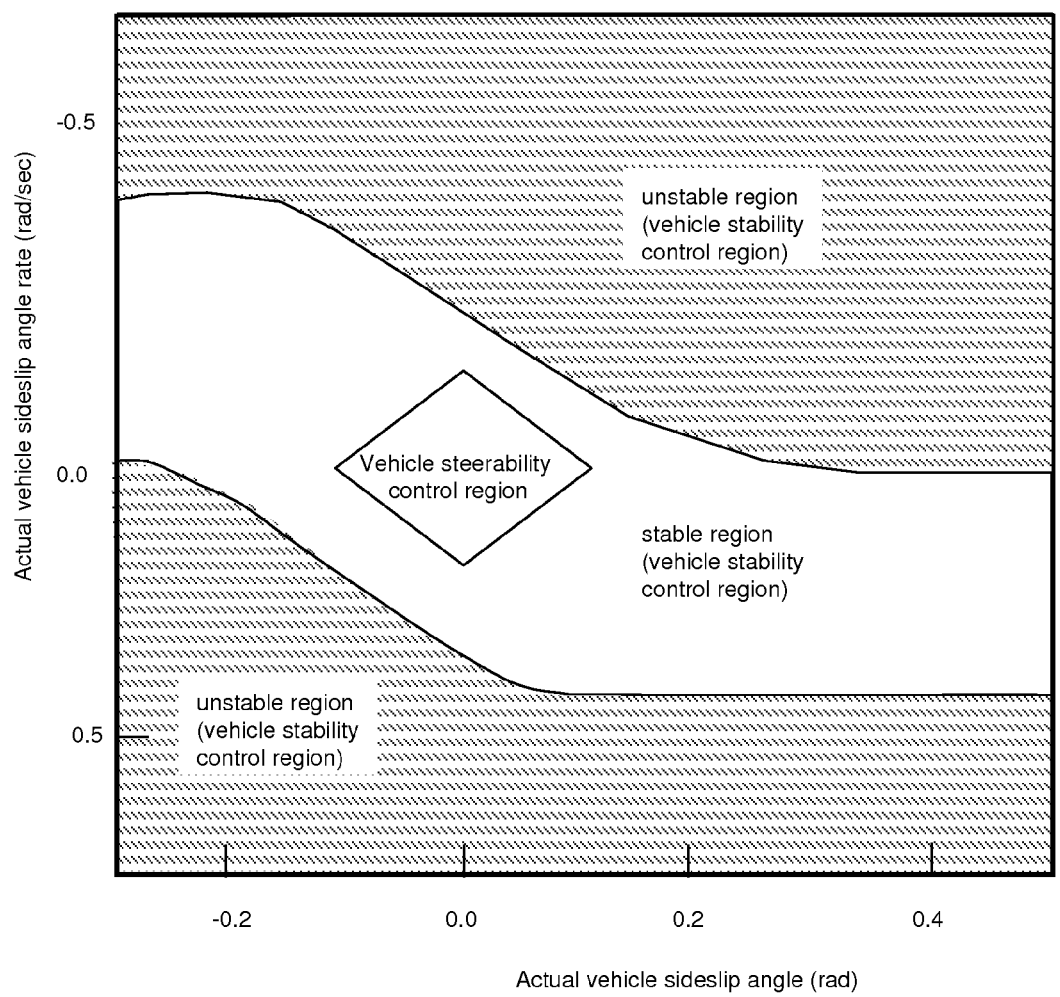

VEHICLE STEERABILITY AND STABILITY CONTROL VIA INDEPENDENT WHEEL TORQUE CONTROL

BACKGROUND

1. Technical Field

The present disclosure relates to vehicle dynamic control for improving vehicle handling while retaining vehicle stability in a vehicle with in-wheel motors on each wheel.

2. Background Art

Vehicle handling assistant systems and stability control technologies have been proposed and implemented to assist the driver in achieving higher level of vehicle steerability and in retaining stability (no fishtailing or plowing) as well as to improve driving comfort. Nevertheless, these existing control technologies are either not available all the time or not desirable in normal driving situations because of the direct interference of the control action on the longitudinal vehicle dynamics and hence disturbances to the driver. It is highly desirable to have an active vehicle dynamic control system that is capable of both assisting the vehicle handing and retaining high level of vehicle stability more effectively and integrated in a wider range of vehicle handling scenarios with minimum undesired driving interventions.

Hybrid electric vehicle that include both an internal combustion engine and electric motor(s) to propel the vehicle are penetrating the marketplace. Battery electric vehicles (BEVs) are starting to be offered in the marketplace. The electricity can be derived from the grid, an on-board fuel cell, on-board generation by an internal combustion engine, a combination thereof, or other suitable manner. One vehicle architecture in a completely electric situation includes in-wheel-motors electric drive systems that can be housed in vehicle wheel assemblies. The design eliminates traditional drivetrain components such as the transmission, axles, the differential, universal joints, the driveshaft, and the central motor. It can also be integrated with an in-wheel active suspension system to achieve an enhanced dynamic control performance utilizing active load distribution and ride damping controls.

SUMMARY

The system with independent wheel motors is ideally suited for drive-by-wire electrical vehicles. Such a distributed propulsion device provides independent wheel control in both acceleration and braking, results in easy integration of regenerative braking, ABS (anti-lock braking systems) as well as traction and stability control systems. The highly integrated control system can provide more powerful and smooth vehicle dynamic performance in a wider range of application environments.

One of the potential applications is that the direct drive feature allows independent differential wheel torque biasing, e.g., one rear wheel may be accelerating while the other rear wheel is braking. Independently driven wheels can provide another steering control input, i.e. torque steering. An additional yaw moment can thus be generated for vehicle steering enhancement and stability compensation purposes by controlling the vehicle yaw rate and sideslip motion. Such approach is more effective in enhancing vehicle stability than an active steering system because the yaw moment resulting from the difference in longitudinal tire forces of the left and right wheels is less significantly influenced by lateral vehicle acceleration.

The discussion herein focuses on torque biasing control of at least two wheels. Most frequently, the two rear wheels are used to serve this active control because the front wheels are often used for propulsion and/or steering purposes, in which case the rear wheels are likely to be more effective at producing a yaw moment. However, the present disclosure applies as well to using the front wheels for generating a yaw moment or controlling all four wheels.

According to one embodiment a method to control an electric vehicle includes determining a desired yaw moment based on vehicle speed, sideslip angle, and the desired yaw rate, determining first and second wheel torques to transmit to first and second wheels coupled to the vehicle to generate first and second longitudinal wheel forces that substantially provides: a portion of the total desired drive torque allocated to the first and second wheels; and the desired yaw moment. In one embodiment, the desired yaw moment is further based on an error between actual and desired yaw rate and sideslip angle. The electric vehicle has four wheels and at least a first electric motor that couples with the first wheel and a second electric motor that couples with the second wheel. The first electric motor is incapable of providing propulsion to the second wheel and the second electric motor is incapable of providing propulsion to the first wheel, i.e., they are independent. In one embodiment, the first and second wheels are rear wheels, the portion of the total desired drive torque distributed to the first and second wheels is substantially equal to the sum of the first and second longitudinal forces times a radius of the wheels and a magnitude of the desired yaw moment is substantially equal to the difference in the first and second longitudinal forces times the wheelbase divided by 2. The desired yaw rate, a total desired drive torque to distribute to vehicle wheels, and the desired sideslip angle are determined based on user inputs. The user inputs include an input to a steering wheel coupled to the vehicle, an input to the accelerator pedal coupled to the vehicle, and an input to a brake pedal coupled to the vehicle. In one embodiment, an actual yaw rate and an actual sideslip angle are estimated based on signals from sensors coupled to the vehicle and the first and second longitudinal forces are adjusted so that actual yaw rate approaches desired yaw rate and actual sideslip angle approaches desired sideslip. In some embodiments, a friction condition between tires coupled to first and second wheels and the surface that the tires are presently contacting is estimated. The first and second forces are decreased to prevent wheel spin tendency and wheel lockup tendency and the magnitude of the decrease is based on the estimated friction condition. Further, the desired yaw moment is decreased to a level which the wheels are capable of providing according to the friction limit. The motors are coupled to a battery via power electronics. In some embodiments, the first and second longitudinal forces are decreased in accordance with a system limitation. The system limitation is based on system electric power limit related to the battery and the power electronics' capabilities.

According to an embodiment the actual sideslip angle and a rate of change in the actual sideslip angle based on sensors coupled to the vehicle is determined. A control objective is applied based on whether the actual sideslip angle and the rate of change in the actual sideslip angle are within a first range or a second range. Within the first range, the control objective favors steerability. Within the second range the control objective favors vehicle lateral stability. Control parameters to calculate the desired yaw moment based on the control objective. In an alternative embodiment, the control objective is based on actual sideslip angle and the actual yaw rate being in a first range or a second range.

A motor vehicle is disclosed which has first, second, third, and fourth electric motors coupled to first, second, third, and fourth wheels of the vehicle, respectively; and vehicle sensors from which actual yaw rate and sideslip angle are determined. Based on vehicle user input devices coupled to an electronic control unit, the electronic control unit: estimates a desired yaw rate, a desired drive torque, and a desired sideslip angle based on the vehicle user input devices, estimates error values of actual yaw rate and actual sideslip angle based on a difference between the actual and desired yaw rates and a difference between actual and desired sideslip angles; determines a desired yaw moment to impart to the vehicle based on the error values; and determines desired longitudinal forces to provide at each of the four wheels to substantially provide the desire drive torque and the desired yaw moment. The electronic control unit determines a rate of change in actual sideslip angle and the electronic control unit determines whether to apply a first control objective or a second control objective based on whether the actual sideslip angle and the rate of change in actual sideslip angle fall within a first range of value or a second range of values wherein the first control objective favors steerability and the second control objective favors lateral stability. The vehicle further includes a battery coupled to the electric motors and electronically coupled to the electronic control unit. The electronic control unit determines desired motor torques to provide the desired longitudinal forces at each of the four wheels, determines system limitations of the battery, determines actual longitudinal forces to provide at each of the four wheels based on the desired longitudinal forces and the system limitations of the battery, and commands the electric motors to provide torque in accordance with the determined actual longitudinal forces.

According to one embodiment, mitigating actions are taken before the unstable tendency becomes apparent or the vehicle becomes unstable, which is an improvement over attempting to overcome vehicle instability.

The electric drivetrain provides more integrated traction and yaw assisted steerability and stability control. Because the control is commanded to electric motors, the torque delivery response is fast and accurate. Furthermore, it replaces expensive active differential devices with electric motors.

Another advantage is that a greater yaw control moment can be obtained to achieve a higher level of vehicle lateral dynamic control due to the capability of applying a braking torque to one of the rear wheels simultaneous with a traction torque to the other rear wheel.

Due to the ability to apply regenerative braking, embodiments of the present disclosure reduce energy consumption compared to background systems with motor/pump actuation such as in electric stability program or active front steering.

Yet another advantage is that increased yaw control moment can be obtained without degrading longitudinal driving performance. The driver is unlikely to be aware that active control actions are taken. The driving experience results in convenient handling and comfortable driving.

BRIEF DESCRIPTION OF THE DRAWINGS

FIG. 5 shows a map of vehicle states reflecting different vehicle behavior in unstable and stable regions and the selection of various control objectives in for steerability control (yaw rate tracking control) and stability control (sideslip restraint control).

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
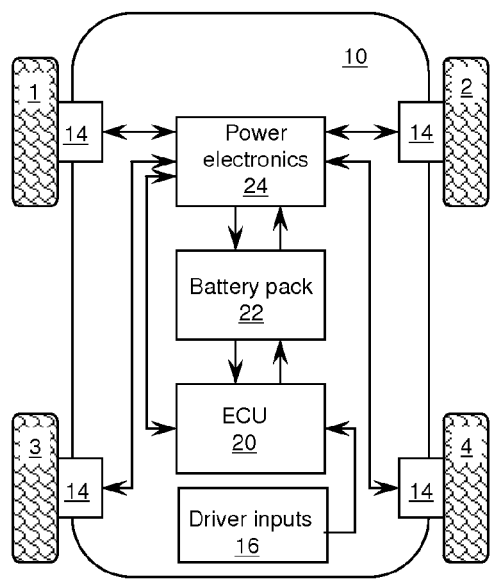
FIG. 1 schematically illustrates components of one type of electric vehicle.

In FIG. 1, a simple schematic of a battery-only electric vehicle 10 is shown. Vehicle 10 has four wheels: front wheels 1, 2 and rear wheels 3, 4 that are each equipped with an electric motor 14. Driver inputs 16, which in one embodiment are inputs to a steering wheel, accelerator pedal, and a brake pedal are provided to an electronic control unit (ECU) 20. ECU 20 controls electrical energy flows between motors 14 and battery pack 22 via power electronics 24.

Figure 2:
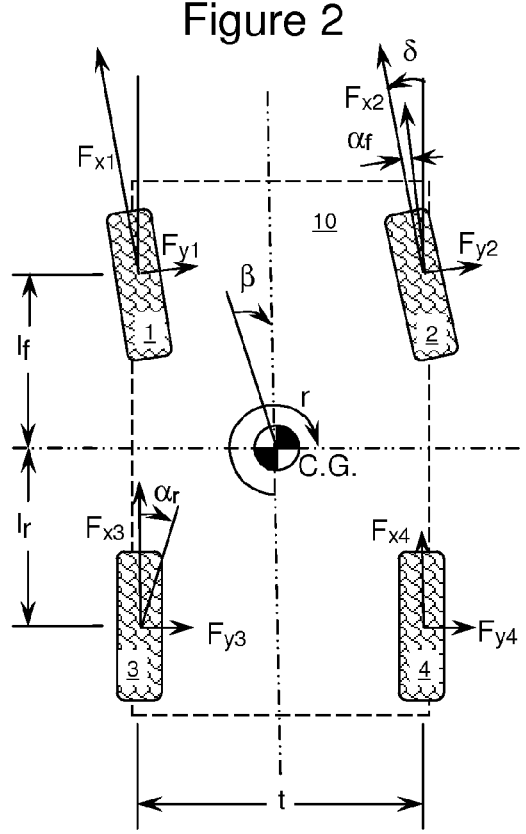
FIG. 2 shows a free body diagram of forces on vehicle wheels and the resultant moments.

In FIG. 2, various forces and moments acting on vehicle 10 are shown graphically. Front wheels 1, 2 are turned an angle $\delta$ from the straight ahead position. Vectors showing forces at the wheels 1-4 are designated Fx1, Fy1, etc. The body slip angle is $\beta$ and individual wheel slip angles are $\alpha$. The track width, t, is the distance between the front or rear wheels. The center of gravity is indicated on FIG. 2 as C.G. The yaw velocity around the center of gravity is denoted by r. The wheelbase is the distance between the center of the front wheels and the center of the rear wheels. The wheelbase is the sum of the forward portion, $l_f$, which is the distance from the front wheels to C.G. and the rearward portion, $l_r$, which is the distance from the rear wheels to C.G.

In relation to FIG. 2, the drive torque to the rear wheels $T_{dr\_rear}$, is related to the sum of the forces applied at rear wheels 3, 4:

$$T_{dr\_rear} = (F_{x3} + F_{x4})R_w$$

where Rw is the wheel radius and longitudinal forces $F_{x3}$ and $F_{x4}$ at wheels 3 and 4, respectively, can be positive or negative values, providing propulsion or braking, respectively. A yaw moment can be generated by differentially distributing the drive torque between the two rear wheels:

$$M_c = (F_{x3} - F_{x4})\frac{t}{2}$$

where t is the track width. By knowing a desired yaw moment and a drive torque for rear wheels, the desired longitudinal forces, $F_{x3}$ and $F_{x4}$, can be determined.

Longitudinal forces are generated between tires and the surface due to torque applied to wheels, to which the tires are coupled, by electric motors coupled to the wheels. The longitudinal force can be a propulsive when electrical energy is supplied to the motor or a braking torque when electrical energy is extracted from the motor. Yet another option is for a torque to be applied to the motor, but in the opposite direction of that which would cause the vehicle to move forward.

Figure 3A:
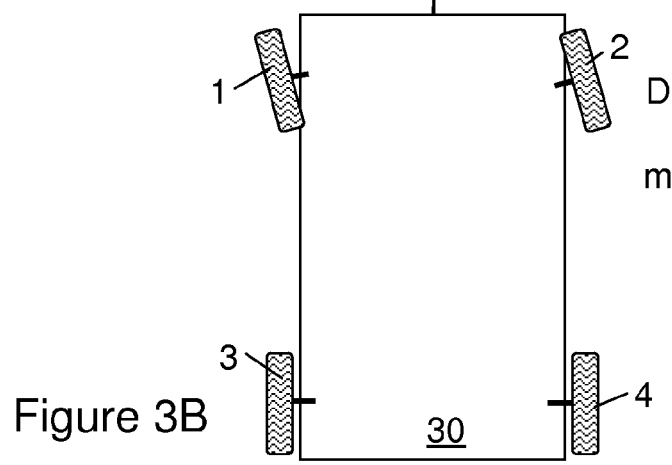
FIGS. 3A-C show a vehicle undergoing a desired turning path, an oversteer path, and an understeer path and yaw control to overcome excessive oversteer and excessive understeer.
Figure 3B:
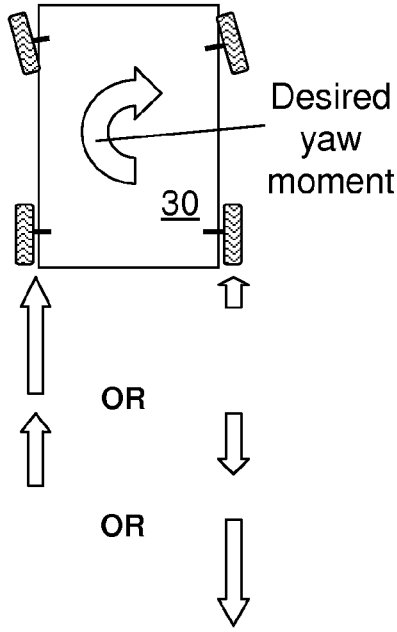
Figure 3C:
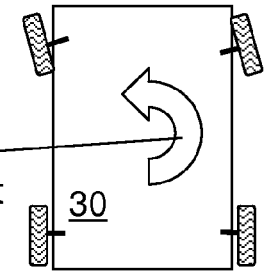

In FIG. 3A, vehicle 10 is shown with the desired path based on the turn of the front wheels. Also, understeer and oversteer paths are shown. In FIG. 3B illustrates a case in which oversteer is overcome by applying a yaw moment. In one example, wheel 3 is provided a positive force of a significantly greater magnitude than the positive force provided to wheel 4. This example applies a moment on vehicle 10 due to the unbalance. In yet another example (shown below the first "OR" in FIG. 3B), a positive force on wheel 3 and a negative force on wheel 4 applies a moment on vehicle 10. Another option is shown at the bottom of FIG. 3B in which only a negative force (braking) is applied to wheel 4. Analogously, understeer is overcome per the options shown in FIG. 3C. In vehicle architectures with the capability of independent application of a brake, but not a positive force, the negative force options shown in FIGS. 3B and 3C are the only possibilities for applying a moment to overcome oversteer or understeer. These options result in reduced forward propulsion. However, in embodiments with wheel motors coupled to each wheel, a greater variety of options exist to provide the desired yaw moment; and the desired yaw moment can be achieved while simultaneously providing forward propulsion of the vehicle.

Figure 4:
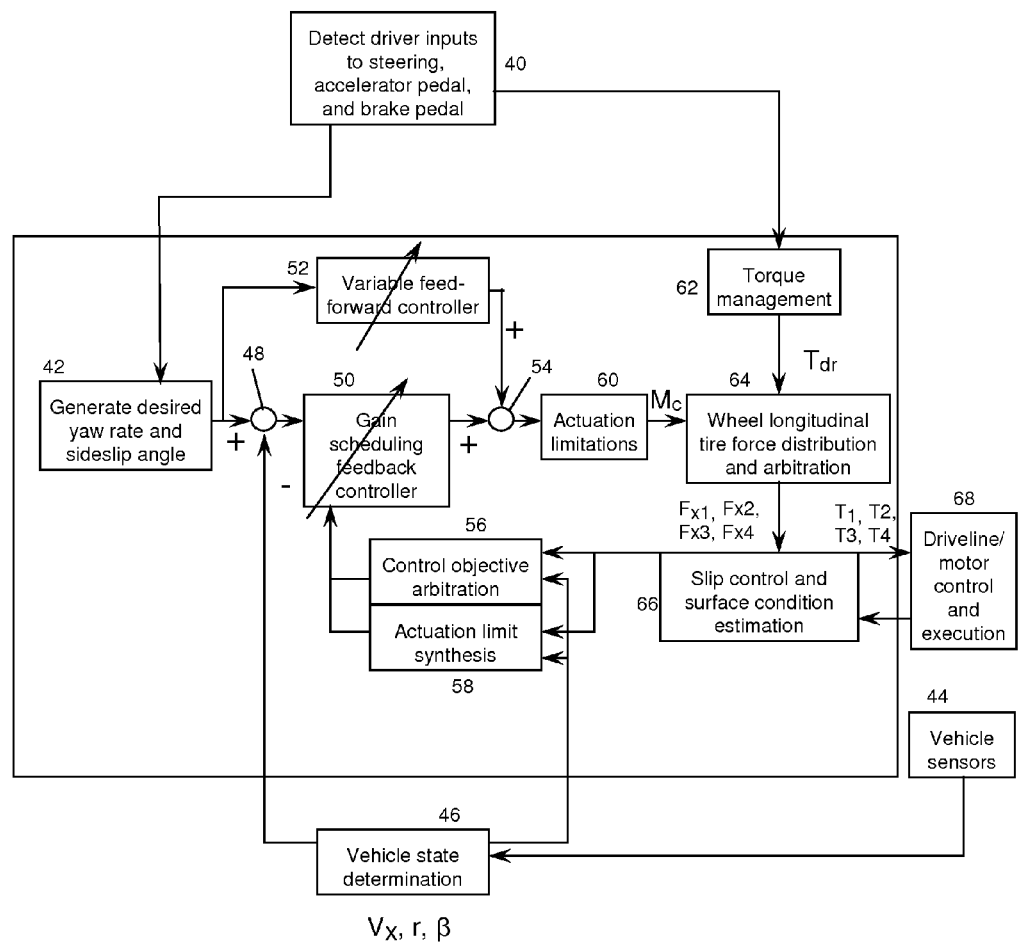
FIG. 4 is a schematic of the layered independent wheel torque control (IWTC) according to an embodiment of the disclosure.

In FIG. 4, a control diagram is shown in which driver inputs to the steering wheel, accelerator pedal, and brake pedal are detected in block 40. The driver inputs are communicated to block 42 of the control algorithm to generate the desired yaw rate and desired sideslip angle. Jumping to the right hand side of FIG. 4, the vehicle is equipped with sensors 44. Based on information from vehicle sensors, such as accelerometers, the actual yaw rate and sideslip angle are estimated in block 46. The actual and desired values of the yaw rate and sideslip angle are provided to comparator 48, which provides an output of error in yaw rate and sideslip angle. These raw errors are provided to a variable gain scheduling feedback controller 50. The gain coefficients are functions of the vehicle state and based on inputs from control objective arbitration 56 and actuation limit synthesis 58, which will be described below. The variable feedforward controller 52 and variable gain scheduling feedback controller 52 are combined in 54 into block 60 in which actuation limitation is determined. Limits on actuation may be due to electrical constraints, such as state of charge of the battery or exceeding the charge or discharge limits of the battery. The output of block 60 is Mc, the desired yaw moment is provided to determine the differential wheel longitudinal forces. In block 62, the torque management system for the vehicle is computed based on an input from the accelerator pedal. The total drive torque desired, Tdr, is determined and communicated to a wheel longitudinal tire force distribution and arbitration block 64. $F_{x3}$, $F_{x4}$, $F_{x3}$, and $F_{x4}$ are determined based on $M_c$, $T_{dr}$, and other vehicle parameters. According to one embodiment, slip control and surface condition are determined in block 66. In another embodiment, these conditions are estimated based on prior values and current vehicle state conditions. These may be used to further limit the command to vehicle wheels. In block 66 torques $T_1$, $T_2$, $T_3$, and $T_4$ to be commanded to control the four motors is determined and communicated to block 68. There is a feedback loop between block 66 and 68 to account for the motors delivering more or less than requested and to converge on the commanded torque.

As described above, there are situations in which longitudinal propulsion is to be provided and situations in which the driver requested longitudinal propulsion is partially sacrificed to provide the desired steering characteristics. Such determination of which function should dominate is determined in block 56, control objective arbitration. In block 58, the limit in actuation of the motors is estimated.

In FIG. 5, one embodiment of the disclosure is illustrated in which the regions in which steerability is favored and which vehicle stability is favored are shown on a plot of rate of change in actual vehicle sideslip angle vs. actual vehicle sideslip angle. In a first range of these two vehicle state parameters, centered around the parameters equaling zero, vehicle steerability is favored. The vehicle is in a very stable zone. Lateral performance of the vehicle is not compromised in this zone and to the extent possible within system limitations, steerability is favored according to a first control objective. The vehicle yaw rate is controlled by the yaw control moment to closely track the desired yaw rate. In a second range of the two vehicle parameters, the vehicle is in a stable region. However, according to a second control objective, vehicle stability is favored, which may result in a diminution of lateral performance of the vehicle. The vehicle sideslip dynamic has to be restraint to avoid further entering the unstable region. By doing so, the vehicle lateral performance will be compromised, i.e. the yaw rate tracking accuracy will be reduced. However, such stability is favored in part to avoid entering an unstable region. In a third range, the vehicle is unstable. However, according to an embodiment of the disclosure, vehicle stability control is applied to attempt to exit the unstable region and regain control over the vehicle.

In an alternative embodiment, a map analogous to FIG. 5 is generated based on actual yaw rate and actual sideslip angle on the axes.

Referring again to FIG. 4, a high level description of the control algorithm is discussed in regards to one special case in which the rear wheels are used for providing control. The vehicle handling parameters are derived from the vehicle states and driver steering input. Based on the desired control target, the feedforward control command can be generated, for example, to track according to Ackerman steering property or a linear steering property. Most importantly, the IWTC feedback control algorithm is executed to calculate the optimal direct yaw control moment. Due to system limitations, the optimal yaw control moment may be clipped in such a manner that both the system actuation limitations and the working condition limitations are not violated for system protection purpose and for vehicle handling stability considerations. After that, the desired yaw control moment $M_c$, is used to calculate tire forces, $F_{x3}$ and $F_{x4}$, to properly deliver both the powertrain traction torque command $T_{dr}$ and the IWTC command, M. Next, a wheel slip controller regulates wheel slip ratio states by exerting wheel torques $T_3$ and $T_4$ to achieve the previous desired wheel force command. The IWTC torque arbitration module and the slip control module together translate the desired yaw control moment into reference torques for the two wheel motors to execute. Such a wheel slip controller is also responsible for the friction condition estimation and the wheel force saturation status feedback. The information is sent to control objective arbitration module and the actuation limitation synthesis module to determine the control parameter selection with respect to instantaneous prominent control objective.

By taking advantage of advanced control methodology, such an auxiliary yaw moment can be utilized either to enhance steering capability or to restrict excessive lateral vehicle dynamics. When driving at low to medium speed range, it may be desirable to use this additional yaw control moment to compensate for vehicle understeer such that the vehicle handling characteristic is close to the Ackerman steering system or a linear vehicle steering characteristic, especially on high-friction surfaces. It even enables tractor steering, that is to turn the vehicle at standstill by generating a pure yaw moment without any longitudinal motion. In the presence of a large steering input and/or at high speed, vehicle lateral stability becomes more important. The yaw control moment obtained from the system may be used as a countermeasure yaw moment to correct excessive vehicle understeer or oversteer tendency without compromising the vehicle longitudinal performance. This correction effect is particularly useful when driving on low-friction surface conditions.

The potential of the disclosed IWTC technology for handling enhancement and stability control are limited by available active yaw control moment, which is in turn limited by system/component capability, vehicle dynamic limits, and the environmental limits. In one example, $F_{rm}$ is the absolute value of the maximum available rear tire force limited by the system components, regenerative capability, and friction forces. The total available range of the active yaw moment control torque is: $-F_{rm}T \leq M_c \leq F_{rm}T$. The total available IWTC active yaw moment is bounded by the electrical vehicle's instantaneous power limit, battery charge limit (a function of State of Charge (SOC) and temperature), battery discharge limit, electric vehicle control mode, and motor torque limit. It is also limited by the ground friction conditions. The actuation of IWTC should not induce any wheel instabilities (spin or lock up) or vehicle instability. To this end, a wheel slip controller is integrated into the IWTC control system to provide ground friction estimation. Feedback of the friction force limit is used to regulate wheel slip within a desirable and stable range. When vehicle instability is already present, e.g. vehicle spin, IWTC control action is not applied since further usage of longitudinal tire force jeopardizes the nearly exhausted lateral tire force reservation of rear wheels and exacerbates the instability. In such situations, a friction brake based stability control system, similar to background systems, is employed to bring the already unstable vehicle back to normal in limit vehicle handling situations. With respect to safety control, the proposed IWTC handling assistant system applied to the rear wheels is more effective to restrain the vehicle lateral dynamics before becoming unstable rather than to bring an already unstable vehicle back to stable its range.

Assuming a linear vehicle model, the steady state vehicle cornering characteristic can be described by the following equation:

$$\delta = \frac{\frac{L}{R}}{1+\frac{F_{xf}}{C_{af}}} + \left[\left(\frac{W_f}{C_{af}} - \frac{W_r}{C_{ar}}\right) - \left(\frac{W_f}{C_{af}}\frac{F_{xf}}{C_{af}} - \frac{W_r}{C_{ar}}\frac{F_{xr}}{C_{ar}}\right)\right]\frac{V^2}{R}$$

where $C_{af}$ and $C_{ar}$ are tire cornering stiffness, $W_f$ and $W_r$ are vehicle weight distribution at the front axle and the rear axle, respectively. V is the longitudinal vehicle speed, L is the wheel base. The vehicle steering property changes nonlinearly with respect to vehicle speed, accelerations and friction condition. When the vehicle is driving at low speed, it is desirable to have the vehicle steering property as close to a reference steering characteristic (the Ackerman steering system or linear steering property) as possible for comfortable vehicle handling. When driving in the high speed range, the speed feedback to the driver is important in handling maneuvers. It is also important to restrain the vehicle lateral dynamics to retain vehicle stability. To these ends, the IWTC system can apply the active yaw moment $M_c$ to assist the steering effort such that:

$$\delta = \frac{L}{R} + k_{des}\frac{V^2}{R}$$

where L/R is the Ackerman steering angle and $k_{des}$ a desired steering characteristic gain determined based on control objectives.

In general, vehicle handling remains consistent with respect to the driver's command on different road conditions. In other words, while maintaining the desired vehicle motion (speed, acceleration, etc.), the IWTC control system tracks desired vehicle dynamics by minimizing the yaw rate error $r_{des}-r$, and body slip angle error $\beta_{des}-\beta$, for any given steering input $\delta$ and vehicle state. The control objective function can be formulated as minimizing:

$$J = \int_0^\infty ((Z-Z_{des})Q(Z-Z_{des}) + M_c^2 R)dt$$

given various road surface condistions, disturbance, and uncertain vehicle dynamics. In the above equation, $Z=[\beta,r]^T$ and $Z_{des}=[\beta_{des},r_{des}]^T$. Q, R are positive definite matrices. Different values of Q and R matrix will be used in different control regions, steerabiltiy control region or stability control region. The control reference, desired values based on user inputs, $Z_{des}=[\beta_{des},r_{des}]^T$ is generated according to the instantaneous control objective, i.e., steering assistance, stability control, or some combination of the two. The instantaneous control objective is determined based on the vehicle state. A control method, such as linear-quadratic regulator (LQR), $H_{2\infty}$ or other suitable control algorithm, can be applied to minimize the control objective function.

In much of the discussion above, the rear wheels are used to provide the desired vehicle control. However, other cases are considered below to which the following assumptions apply:

There is a compromise on lateral tire forces due to application of the active IWTC wheel torques; the unmodelled traction and vehicle yaw variation with respect to the driver intended vehicle traction and yaw condition are compensated by the feedback controller proposed in IWTC control architecture.

Application of the active IWTC yaw control moment is subject to the tire-road friction limits, vehicle dynamic and stability limits, and the vehicle's system torque and power limits.

There are many degrees of control freedom with the in-wheel-motor, all-wheel drive vehicle configuration. The reference control commands herein are only a subset of potential application cases among them. Additional application strategy can be further implemented based on wheel torque distribution optimization in combination with vehicle dynamic stability and handling control systems like AFS and ESP, etc.

The description herein considers front wheel steering cases. But the present development does not exclude cases in which all wheels can steer in a turning maneuver.

Another special case is for front wheels only, pure yaw moment control. To achieve a pure yaw moment control while maintaining vehicle drivability transparent to the driver, the torques of front, in-wheel-motors are actively modulated. It is assumed that initially the front wheel torque is $T_{d1}$ at the front left wheel and $T_{d2}$ at the front right wheel. To obtain a yaw control moment $M_z^c$ the active wheel feedforward/reference control torque is computed as $$\Delta T_{d1} = \frac{M_c \cos\delta_2}{\left[\frac{l_f}{R_w}\sin(\delta_1 - \delta_2) + \frac{t}{R_w}\cos\delta_1 \cos\delta_2\right]}$$

$$\Delta T_{d2} = \frac{M_c \cos\delta_1}{\left[\frac{l_f}{R_w}\sin(\delta_2 - \delta_1) - \frac{t}{R_w}\cos\delta_1 \cos\delta_2\right]}$$

where $T_{di}$ is the in-wheel-motor drive torque at the i-th wheel; i=1, 2, 3, 4 indicates front left, front right, rear left and rear right wheel respectively; $M_c$ is the target pure yaw control torque to be achieved through IWTC technology; $\delta_j$ is the front wheel steering angle, where j=1, 2 indicates left and right front wheels; $R_w$ is effective wheel radius; t is track width; $l_f$ is the distance from the middle point of the two front wheel assemblies to the C.G.

The new wheel torque at the front left wheel is $T_{d1}{}'' = T_{d1} + \Delta T_{d1}$; and the new wheel torque at the front right wheel is $T_{d2}{}'' = T_{d2} + \Delta T_{d2}$. The control capability, i.e. the maximal available magnitude of $M_c$, is mainly determined by the magnitudes of $T_{d1}$ and $T_{d2}$, the positive and negative torque limits at the two in-wheel-motor $T_{d1}{}^{max}/T_{d1}{}^{min}$ and $T_{d2}{}^{max}/T_{d2}{}^{min}$ and the electrical power and torque limits at a present driving condition.

When the active pure yaw control moment is delivered through a combination of one of the front wheels and one of the rear wheels at the opposite side from the one front wheel, the following active control torque commands are:

$$\Delta T_{d1} = \frac{M_c}{\left[\frac{l_f}{R_w}\sin\delta_1 + \frac{t}{R_w}\cos\delta_1\right]}$$

$$\Delta T_{d4} = \frac{-M_c \cos\delta_1}{\left[\frac{l_f}{R_w}\sin\delta_1 + \frac{t}{R_w}\cos\delta_1\right]}$$

Or alternatively:

$$\Delta T_{d2} = \frac{-M_c}{\left[\frac{l_f}{R_w}\sin\delta_2 + \frac{t}{R_w}\cos\delta_2\right]}$$

$$\Delta T_{d3} = \frac{M_c \cos\delta_2}{\left[\frac{l_f}{R_w}\sin\delta_2 + \frac{t}{R_w}\cos\delta_2\right]}$$

For a front and rear wheel on the same side of the vehicle to deliver the pure yaw control moment, the following active control torque commands is requested:

$$\Delta T_{d1} = \frac{M_c}{\frac{l_f}{R_w}\sin\delta_1}$$

$$\Delta T_{d3} = \frac{-M_c \cos\delta_1}{\frac{l_f}{R_w}\sin\delta_1}$$

Or alternatively:

$$\Delta T_{d2} = \frac{-M_c}{\frac{l_f}{R_w}\sin\delta_2}$$

$$\Delta T_{d4} = \frac{M_c \cos\delta_2}{\frac{l_f}{R_w}\sin\delta_2}$$

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A method to control an electric vehicle, composing:
   determining, in a controller, a desired yaw rate, a total desired drive torque, and a desired sideslip angle based on user inputs;
   determining, in the controller, a desired yaw moment based on vehicle speed, sideslip angle, and the desired yaw rate; and
   determining, in the controller, first and second wheel torques to transmit to first and second wheels coupled to the vehicle to generate first and second longitudinal wheel forces that substantially provide:
      a portion of the total desired drive torque allocated to the first and second wheels; and
      the desired yaw moment;
      a sum of the first and second wheel torques being equal to the portion of the total desired drive torque allocated to the first and second wheels; and
   adjusting, by way of the controller, the first wheel torque by a first active wheel reference torque, $\Delta T_{d1}$, and a second wheel torque by a second active wheel reference torque, $\Delta T_{d2}$, wherein the first and second active wheel reference torques are functions of the desired yaw moment, a steering wheel angle, an effective wheel radius, and a vehicle track width, the adjustments being made to the first and second wheels according to a configuration for the first and second wheels selected from the group consisting of: first and second front wheels having a particular left front wheel steering angle, $\delta_1$, and a particular front right wheel steering angle, $\delta_2$, which are together used to calculate the first and second active wheel reference torques $\Delta T_{d1}$ and $\Delta T_{d2}$, a front wheel on one side of the vehicle and a rear wheel on an opposite side of the vehicle, and a front wheel and a rear wheel on one side of the vehicle.

2. The method of claim 1 wherein the electric vehicle has four wheels, each of a first electric motor and a second electric motor couples with only a single vehicle wheel, the first electric motor is coupled to the first wheel, and the second electric motor is coupled to the second wheel.

3. The method of claim 2, further comprising:
determining first and second wheel torques that the first and second motors apply to the first and second wheels to provide the first and second longitudinal forces generated from first and second tires coupled to the first and second wheels, respectively.

4. The method of claim 2 wherein the motors are coupled to a battery via power electronics, further comprising:
decreasing the first and second longitudinal forces in accordance with a system limitation wherein the system limitation is based on system electric power limit related to the battery and the power electronics' capabilities.

5. The method of claim 1 wherein the first and second wheels are front wheels, further comprising:
adjusting the first torque by $$\Delta T_{d1} = \frac{M_c \cos\delta_2}{\left[\frac{l_f}{R_w}\sin(\delta_1 - \delta_2) + \frac{t}{R_w}\cos\delta_1\cos\delta_2\right]};$$

and
adjusting the second torque by $$\Delta T_{d2} = \frac{M_c \cos\delta_1}{\left[\frac{l_f}{R_w}\sin(\delta_2 - \delta_1) - \frac{t}{R_w}\cos\delta_1\cos\delta_2\right]}$$

where
$M_c$ is the desired yaw moment to be achieved through IWTC technology: $\delta_j$ is the front wheel steering angle, where j=1,2 indicates left and right front wheels; $R_w$ is effective wheel radius; t is track width; $l_f$ is the distance from the middle point of the two front wheel assemblies to the C.G.

6. The method of claim 1 wherein the first wheel is a front wheel on one side of the vehicle and the second wheel is a rear wheel on an opposite side of the vehicle from the one side, further comprising:
adjusting the first torque by $$\Delta T_{d1} = \frac{M_c}{\left[\frac{l_f}{R_w}\sin\delta_1 + \frac{t}{R_w}\cos\delta_1\right]};$$

and
adjusting the second torque by $$\Delta T_{d2} = \frac{-M_c \cos\delta_1}{\left[\frac{l_f}{R_w}\sin\delta_1 + \frac{t}{R_w}\cos\delta_1\right]}$$

where $M_c$ is the desired yaw moment to be achieved, through IWTC technology; $\delta_j$ is the front wheel steering angle, where j=1,2 indicates first and second wheels; $R_w$ is effective wheel radius; t is track width; $l_f$ is the distance from the middle point of the two front wheel assemblies to the C.G.

7. The method of claim 1 wherein the first wheel is a front wheel on one side of the vehicle and the second wheel is a rear wheel on the one side of the vehicle, further comprising:
adjusting the first torque by $$\Delta T_{d1} = \frac{M_c}{\frac{l_f}{R_w}\sin\delta_1};$$

and
adjusting the second torque by $$\Delta T_{d2} = \frac{-M_c \cos\delta_1}{\frac{l_f}{R_w}\sin\delta_1}$$

where $M_c$ is the desired yaw moment to be achieved through IWTC technology; $\delta_j$ is the front wheel steering angle, where j=1,2 indicates first and second wheels; $R_w$ is effective wheel radius; t is track width; $l_f$ is the distance from the middle point of the two front wheel assemblies to the C.G.

8. The method of claim 1 wherein the desired yaw rate, a total desired drive torque to distribute to vehicle wheels, and the desired sideslip angle are determined based on user inputs and the user inputs include an input to a steering wheel coupled to the vehicle, an input to the accelerator pedal coupled to the vehicle, and an input to a brake pedal coupled to the vehicle.

9. The method of claim 1, further comprising:
estimating an actual yaw rate and an actual sideslip angle based on signals from sensors coupled to the vehicle; and
adjusting the first and second longitudinal forces so that actual yaw rate approaches desired yaw rate and actual sideslip angle approaches desired sideslip.

10. The method of claim 1, further comprising:
estimating a friction condition between tires coupled to the first and second wheels and the surface that the tires are presently contacting; and
decreasing the first and second longitudinal forces to prevent wheel spin tendency and wheel lockup tendency and the magnitude of the decrease is based on the estimated friction condition; and
decreasing the desired yaw moment to a level which the wheels are capable of providing according to the friction limit.

11. The method of claim 1, further comprising:
determining, in the controller, the actual sideslip angle and a rate of change in the actual sideslip angle based on sensors coupled to the vehicle;
determining, in the controller, a control objective to be applied to a torque management system for the vehicle based on whether the actual sideslip angle and the rate of change in the actual sideslip angle are within a first range or a second range wherein within the first range the control objective favors steerability and within the second range the control objective favors vehicle lateral stability; and
altering control parameters used to calculate the desired yaw moment based on the control objective.

12. The method of claim 1, further comprising:
determining, in the controller, the actual sideslip angle and the actual yaw rate based on sensors coupled to the vehicle;
determining, in the controller, a control objective to be applied to the vehicle by an electronic control unit based on whether the actual sideslip angle and the actual yaw rate are within a first range or a second range wherein within the first range the control objective favors steerability and within the second range the control objective favors vehicle lateral stability; and
altering control parameters used to calculate the desired yaw moment based on the control objective.

13. A motor vehicle, comprising:
first, second, third, and fourth electric motors coupled to first, second, third, and fourth wheels of the vehicle, respectively;
vehicle sensors from which actual yaw rate and sideslip angle are determined;
vehicle user input devices coupled to an electronic control unit wherein the electronic control unit is configured to estimate a desired yaw rate, a desired drive torque, and a desired sideslip angle based on the vehicle user input devices;
the electronic control unit is configured to estimate error values of actual yaw rate and actual sideslip angle based on a difference between the actual and desired yaw rates and a difference between actual and desired sideslip angles;
the electronic control unit is configured to determine a desired yaw moment to impart to the vehicle based on the error values;
the electronic control unit is configured to determine desired longitudinal forces to provide at each of the four wheels to substantially provide the desire drive torque and the desired yaw moment;
the electronic control unit is configured to determine a rate of change in actual sideslip angle; and
the electronic control unit is configured to determine whether to apply a first control objective or a second control objective to a torque management system based on whether the actual sideslip angle and the rate of change in actual sideslip angle fall within a first range of values or a second range of values, wherein the electronic control unit is configured to determine to apply the first control objective when vehicle steerability is to be favored and to determine to apply the second control objective when vehicle lateral stability is to be favored.

14. The motor vehicle of claim 13, further comprising:
a battery coupled to the electric motors and electronically coupled to the electronic control unit wherein the electronic control unit is configured to determine desired motor torques to provide the desired longitudinal forces at each of the four wheels;
the electronic control unit is configured to determine system limitations of the battery;
the electronic control unit is configured to determine actual longitudinal forces to provide at each of the four wheels based on the desired longitudinal forces and the system limitations of the battery; and
the electronic control unit is configured to command the electric motors to provide torque in accordance with the determined actual longitudinal forces.

15. A method to control an electric vehicle, comprising:
determining a desired yaw rate and a desired drive torque;
determining a desired sideslip angle based on user inputs;
estimating an actual yaw rate and an actual sideslip angle based on signals from sensors coupled to the vehicle;
determining a sideslip angle error based on a difference between the desired sideslip angle and the actual sideslip angle and a yaw rate error based on a difference between the desired yaw rate and the actual yaw rate;
determining a desired yaw moment based on vehicle speed and the desired yaw rate;
determining longitudinal forces to transmit through four vehicle wheels to substantially provide the desired drive torque and the desired yaw moment;
arbitrating the selection of first and second control objectives wherein a first control objective is selected when vehicle steerability is to be favored and a second control objective is selected when vehicle stability is to be favored; and
adjusting the determined longitudinal forces so that actual yaw moment obtained from the difference of the longitudinal wheel forces approaches the desired yaw moment wherein the desired yaw moment is based on the yaw rate error, the sideslip angle error, and selection of either the first or second control objective;
commanding torque to four individual wheel motors coupled to the four wheels based on the determined longitudinal forces and the selected control objective.

16. The method of claim 15 wherein the torque commanded to the four individual wheel motors is further based on limitations imposed by at least one of: state of charge of the battery, maximum charge rate of the battery, maximum discharge rate of the battery, and road friction limits.

17. The method of claim 15, further comprising:
detecting wheel spin tendency for at least two vehicle wheels;
detecting a wheel lockup tendency for the at least two vehicle wheels wherein the determined longitudinal forces are further based on wheel spin tendency and wheel lockup tendency so as to prevent wheel spin tendency and wheel lockup tendency.

* * * * *